United States Patent
Gibbs

(10) Patent No.: US 11,422,312 B2
(45) Date of Patent: Aug. 23, 2022

(54) FIBER OPTIC CONVERTER

(71) Applicant: CommScope Technologies LLC, Hickory, NC (US)

(72) Inventor: Gary Federico Gibbs, Wylie, TX (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 16/870,341

(22) Filed: May 8, 2020

(65) Prior Publication Data

US 2020/0355872 A1 Nov. 12, 2020

Related U.S. Application Data

(60) Provisional application No. 62/845,673, filed on May 9, 2019.

(51) Int. Cl.
  *G02B 6/38* (2006.01)
(52) U.S. Cl.
  CPC ........... *G02B 6/3825* (2013.01); *G02B 6/389* (2013.01); *G02B 6/3821* (2013.01); *G02B 6/3851* (2013.01); *G02B 6/3869* (2013.01); *G02B 6/3874* (2013.01)
(58) Field of Classification Search
  CPC .. G02B 6/3825; G02B 6/3821; G02B 6/3869; G02B 6/38
  USPC .......................................................... 385/78
  See application file for complete search history.

(56) References Cited

U.S. PATENT DOCUMENTS

| | | | |
|---|---|---|---|
| 6,149,313 A * | 11/2000 | Giebel | G02B 6/3825 385/53 |
| 6,151,432 A * | 11/2000 | Nakajima | G02B 6/3831 385/55 |
| 6,364,537 B1 | 4/2002 | Maynard | |
| 6,634,796 B2 | 10/2003 | de Jong et al. | |
| 6,758,600 B2 | 7/2004 | Del Grosso et al. | |
| 6,793,399 B1 * | 9/2004 | Nguyen | G01M 11/088 356/241.1 |
| 6,869,227 B2 | 3/2005 | Del Grosso et al. | |
| 7,184,635 B2 | 2/2007 | Livingston | |
| 7,689,079 B2 | 3/2010 | Burnham et al. | |
| 9,310,569 B2 | 4/2016 | Lee | |
| 9,804,340 B1 | 10/2017 | Lin | |
| 2008/0019642 A1* | 1/2008 | Kewitsch | G02B 6/3825 385/72 |
| 2009/0148103 A1* | 6/2009 | Lu | G02B 6/3893 385/62 |
| 2009/0304335 A1* | 12/2009 | Marcouiller | G02B 6/3869 385/78 |
| 2010/0215321 A1* | 8/2010 | Jenkins | G02B 6/3893 385/78 |
| 2011/0116748 A1* | 5/2011 | Smrha | G02B 6/3825 385/76 |
| 2012/0099822 A1* | 4/2012 | Kuffel | G02B 6/383 385/78 |
| 2012/0294572 A1* | 11/2012 | Petersen | G02B 6/3817 385/78 |
| 2013/0156379 A1* | 6/2013 | Ott | G02B 6/3869 385/76 |

(Continued)

*Primary Examiner* — Kaveh C Kianni
(74) *Attorney, Agent, or Firm* — Merchant & Gould P.C.

(57) ABSTRACT

The present disclosure relates to a converter including an elongate sleeve having a first and an opposite second end. The converter also includes first and second multi-fiber connectors respectively mounted at the first and second ends.

22 Claims, 15 Drawing Sheets

(56) References Cited

U.S. PATENT DOCUMENTS

| | | | |
|---|---|---|---|
| 2013/0183001 A1* | 7/2013 | Ott | G02B 6/3881 |
| | | | 385/72 |
| 2013/0216186 A1* | 8/2013 | Ott | G02B 6/3863 |
| | | | 385/70 |
| 2014/0023326 A1* | 1/2014 | Anderson | G06K 7/10366 |
| | | | 385/78 |
| 2014/0219615 A1* | 8/2014 | Petersen | G02B 6/3825 |
| | | | 385/88 |
| 2018/0217335 A1* | 8/2018 | Leeson | G02B 6/3893 |
| 2018/0364424 A1* | 12/2018 | Ott | G02B 6/44 |
| 2019/0170961 A1* | 6/2019 | Coenegracht | G02B 6/4444 |
| 2019/0265418 A1* | 8/2019 | Gniadek | G02B 6/3891 |
| 2020/0310041 A1* | 10/2020 | Chang | G02B 6/3887 |
| 2021/0003801 A1* | 1/2021 | Ott | G02B 6/4438 |
| 2021/0011235 A1* | 1/2021 | Wimmer | G02B 6/3831 |

* cited by examiner

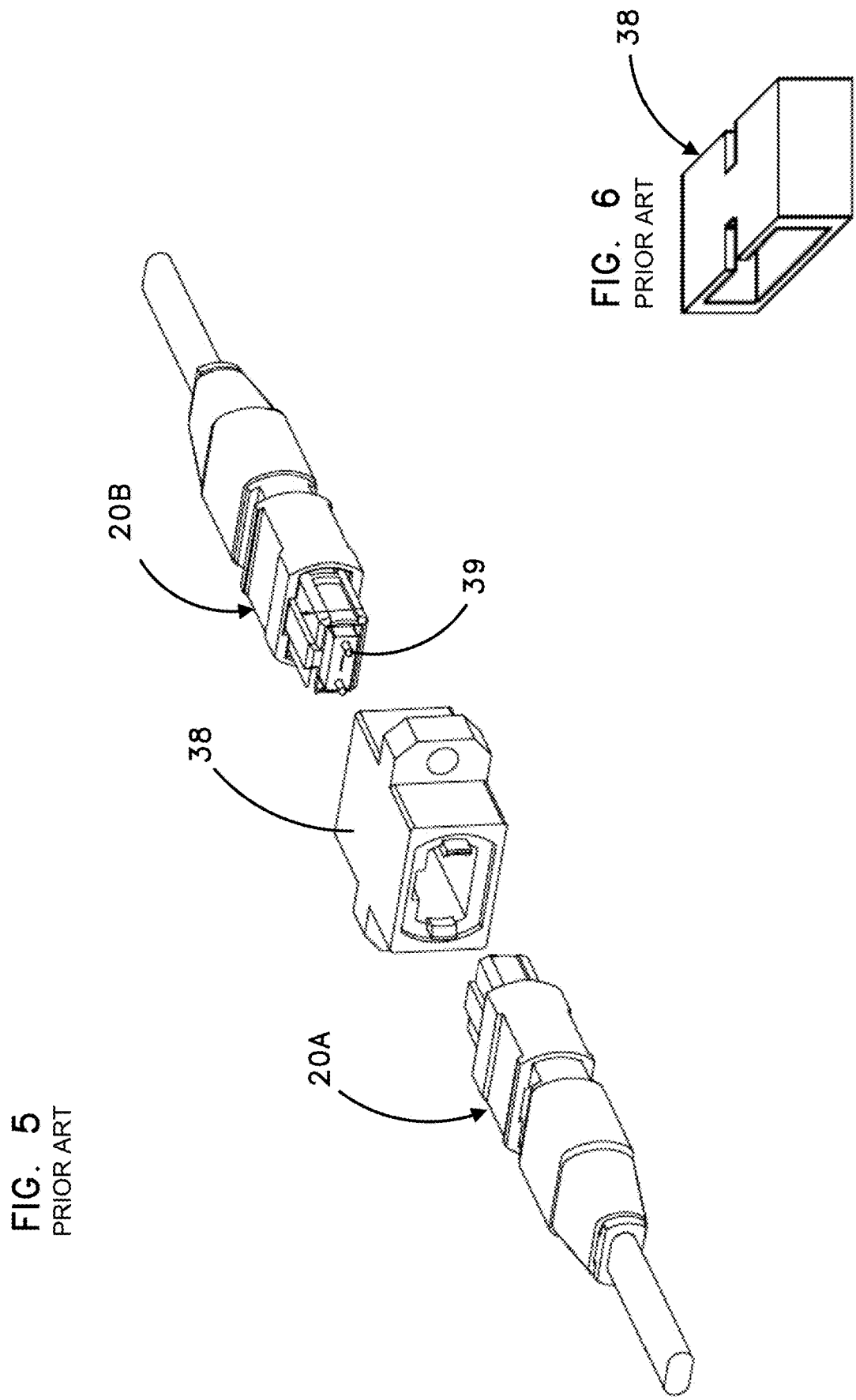

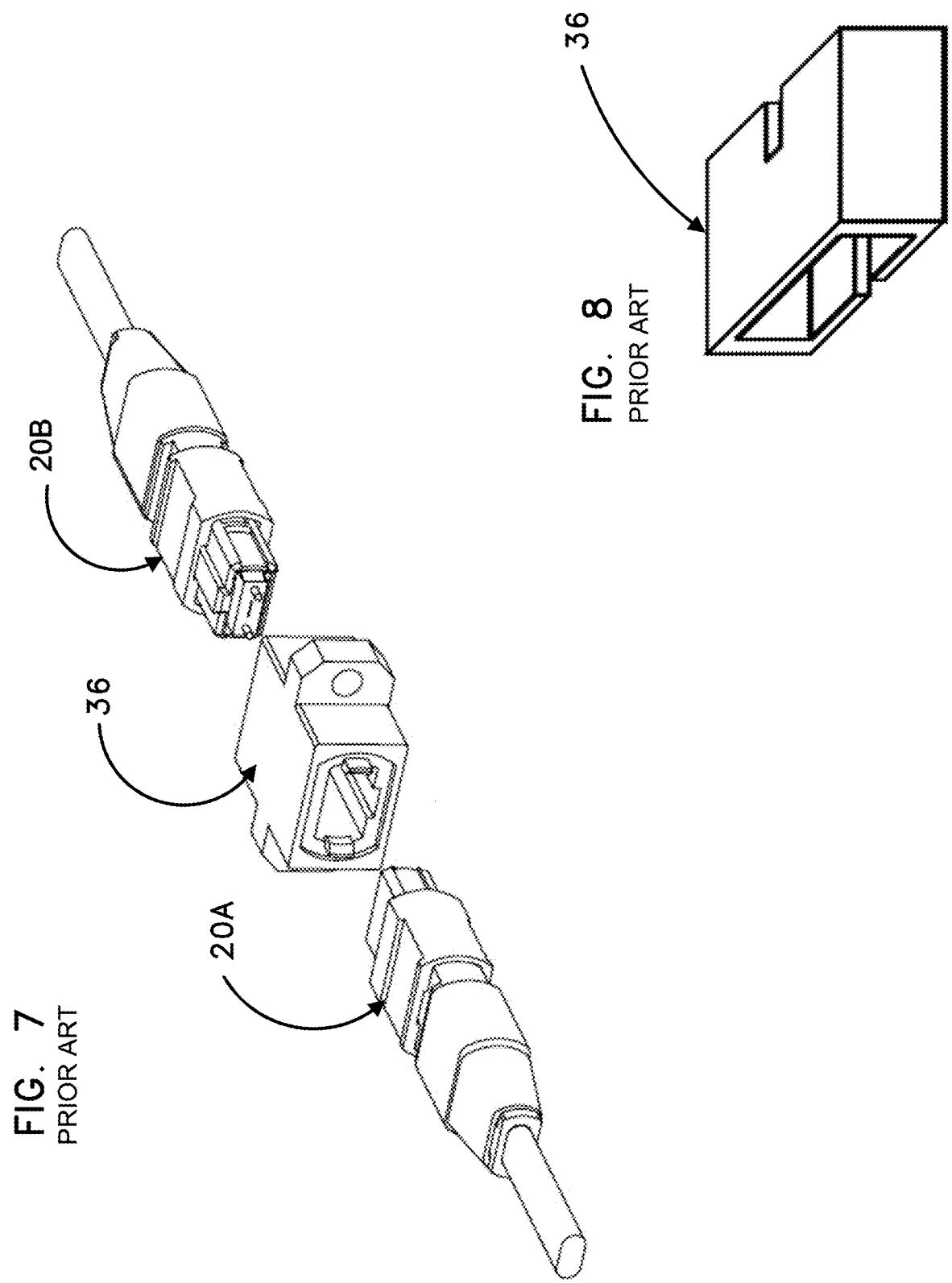

FIBER OPTIC CONVERTER

CROSS-REFERENCE TO RELATED APPLICATIONS

This application claims priority to and the benefit of U.S. Provisional Application No. 62/845,673, filed May 9, 2019, and titled "FIBER OPTIC CONVERTER," the disclosure of which is hereby incorporated herein by reference in its entirety.

BACKGROUND

In a fiber optic system, polarity relates to maintaining a direction of signal travel throughout the length a given optical fiber path (e.g., fiber link, optical transmission path). In many multi-fiber optical systems, it is important to manage polarity so that a continuous optical fiber path is provided between two desired end locations. For example, for common applications, it is crucial for a given optical fiber path to extend from a given transmitter at one end of the optical fiber path to a given receiver at an opposite end of the optical fiber path. Maintaining proper polarity can be difficult because a typical optical system has an architecture that includes multi-fiber cables coupled together end-to-end by multi-fiber connectors to form the optical fiber paths. If the multi-fiber cables are not constructed or coupled together in a way in which proper polarity is maintained, the optical fiber paths will not couple to the desired end points. To assist the industry in selecting and installing the appropriate components (e.g., multi-fiber optical cables, multi-fiber optical connectors, multi-fiber optical adapters, fiber optic equipment) in the appropriate configurations to maintain proper polarity, industry installation standards have been established. Example polarity methods established by the telecommunications industry for MPO connectivity include Method A, Method B and Method C.

Architectures employing MPO connectivity utilize MPO connectors, multi-fiber cables having ends terminated by MPO connectors, and MPO adapters for coupling two MPO connectors together. FIG. 1 depicts a typical MPO connector 20 including an MPO ferrule 22 mounted at the end of an MPO connector body 24. A release sleeve 26 for releasing the MPO connector 20 from an MPO adapter is mounted on the MPO connector body 24. The MPO connector body 24 includes a key 28. The MPO ferrule 22 defines a row of twelve fiber openings 30 in which optical fibers are secured. The fiber openings 30 have been assigned fiber positions by the telecommunications industry. For example, when the MPO connector 20 is viewed with the key 28 up as shown at FIG. 1, the fiber openings 30 define fiber positions 1-12 numbered consecutively from left to right.

Components for supporting Method A, Method B and Method C polarity management architectures can have different configurations. For example, FIGS. 2-4 respectively show a Type-A cord 32 used primarily for Method A applications, a Type-B cord 33 used primarily for Method B applications and a Type-C cord 34 used primarily for Method C applications. The cords 32-34 each have MPO connectors at each end and twelve optical fibers routed through the cords and terminated at the MPO connectors. In the Type-A cord 32, the optical fibers are not laterally transposed such that the ends of each optical fiber are secured at the same position at each of the MPO connectors. As depicted at FIG. 2, one of the MPO connectors is key up, the other MPO connector is key down, and the optical fibers are routed straight between the MPO connectors. In the Type-B cord 33, the optical fibers are laterally transposed such that the ends of each optical fiber are secured at opposite lateral positions at each of the MPO connectors. As depicted at FIG. 3, the MPO connectors are both key up, and the optical fibers are routed straight between the MPO connectors. Thus, the optical fibers respectively are connected between fiber positions: 1 and 12; 2 and 11; 3 and 10; 4 and 9; 5 and 8; 6 and 7; 7 and 6; 8 and 5; 9 and 4; 10 and 3; 11 and 2; and 12 and 1. The Type-C cord, shown at FIGS. 4 and 4A, has pair-wise flipping/transposition of the optical fibers so the optical fibers are respectively coupled between fiber positions: 1 and 2; 2 and 1; 3 and 4; 4 and 3; 5 and 6; 6 and 5; 7 and 8; 8 and 7; 9 and 10; 10 and 9; 11 and 12; and 12 and 11.

MPO fiber optic adapters are used to couple two MPO connectors together. The MPO fiber optic adapters include latches for retaining the MPO connectors within ports of the MPO adapters. The release sleeves 26 of the MPO connectors are pulled-back relative to the MPO connector bodies 24 to release the MPO connectors from the ports. MPO adapters can have a Type-B configuration (see FIG. 5 showing MPO connectors 20a, 20b aligned with a Type B adapter 38 as also shown at FIG. 6) for Method B applications and a Type-A configuration (see FIG. 7 showing MPO connectors 20a, 20b aligned with a Type A adapter 36 as also shown at FIG. 8) for Method B applications. The Type A adapter 36 has a key-up to key-down configuration for orienting the MPO connectors 20a, 20b so that the fiber positions of the MPO connectors 20a, 20b are not laterally transposed. In contrast, the Type B adapter 38 has a key-up to key-up configuration for orienting the MPO connectors 20a, 20b so that the fiber positions of the MPO connectors 20a, 20b are laterally transposed.

MPO connectors can either be female or male. A male MPO connector has alignment pins 39 that protrude from the MPO ferrule (e.g., see MPO connector 20b in FIG. 5) while a female MPO connector has openings in the MPO ferrule for receiving the pins 39 of the male MPO connector to provide alignment between the male and female MPO connectors when the MPO connectors are coupled together.

MPO connectors can include MPO ferrules with end faces that are perpendicular relative to the axes of the optical fibers supported by the ferrules. As used herein, this type of end face is referred to as a perpendicular end face and is typically used with multi-mode optical fibers. This type of end face can also be referred to as a flat end face. MPO connectors can also include MPO ferrules with end faces that are obliquely angled relative to the axes of the optical fibers supported by the ferrules. As used herein, this type of end face is referred to as an obliquely angled end face and is typically used with single mode optical fibers. This type of end face can also be referred to as an angled end face. Generally, obliquely angled end faces are angled about 8 degrees relative to perpendicular with respect to the axes of the optical fibers supported by the ferrule. Obliquely angled end faces can be oriented to face toward the MPO connector key (typically called an "angled-up" configuration) or can be oriented to face away from the MPO connector key (typically called an "angled-down" configuration).

SUMMARY

It will be appreciated that the different configurations of equipment used to implement the various polarity methods can present problems with respect to compatibility. For example, equipment designed for Method A systems can be incompatible with respect to equipment designed for Method B systems, and vice versa. By way of example, cable testing equipment is often designed with compatibility with respect to either Method A components or Method B components. Therefore, equipment designed for testing Method A components generally cannot be readily used to test Method B Type components, and vice versa. Similarly, the male and female configurations of the MPO connectors as well as the obliquely angled end face configurations of certain MPO connectors can also present issues with respect to compatibility. Aspects of the present disclosure relate to converter configurations adapted for enhancing interconnection compatibility within the telecommunications industry.

Another aspect of the present disclosure relates to a converter including a housing forming an elongate sleeve having a length that extends along a central axis between a first end and a second end. The converter also includes a first multi-fiber connector integrated with the first end of the sleeve. The first multi-fiber connector includes a first multi-fiber ferrule. The converter further includes a second multi-fiber connector integrated with the second end of the sleeve. The second multi-fiber connector includes a second multi-fiber ferrule. The converter further includes a plurality of optical fibers routed through the housing. The optical fibers have first end portions at the first multi-fiber ferrule and second end portions at the second multi-fiber ferrule.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 depicts a prior art Type B adapter with corresponding MPO fiber optic connectors aligned therewith;

FIG. 6 is a schematic view of the prior art Type B adapter of FIG. 5;

FIG. 7 depicts a prior art Type A fiber optic adapter with corresponding MPO fiber optic connectors aligned therewith;

FIG. 8 is a schematic view of the prior art Type A fiber optic adapter of FIG. 7;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
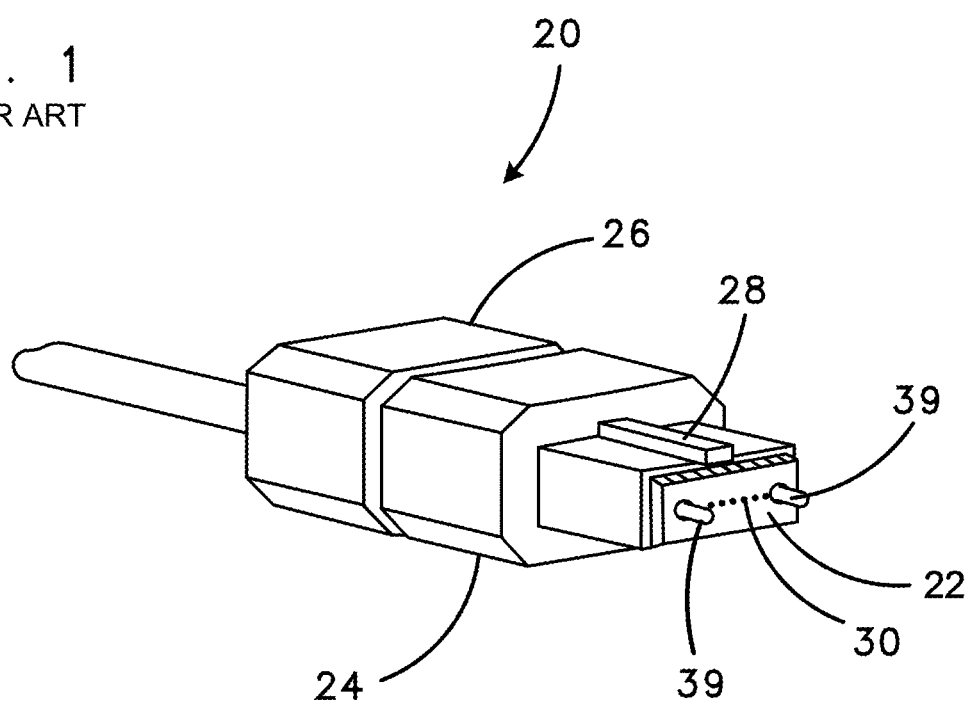
FIG. 1 schematically depicts a prior art MPO ferrule.
Figure 2:
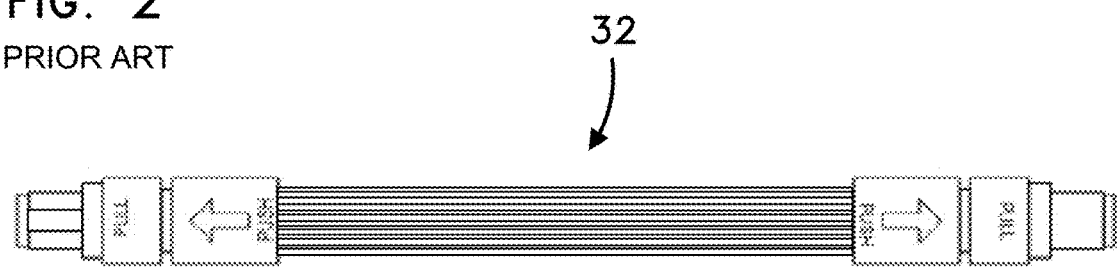
FIG. 2 depicts a prior art Type A patch cord assembly.
Figure 3:
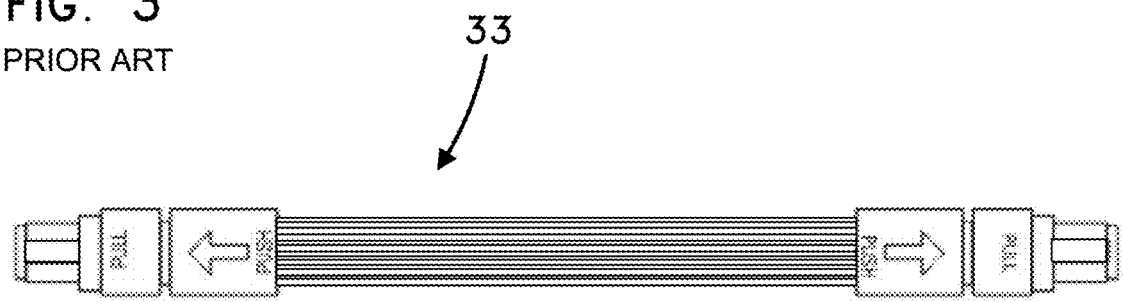
FIG. 3 depicts a prior art Type B patch cord assembly.
Figure 4:
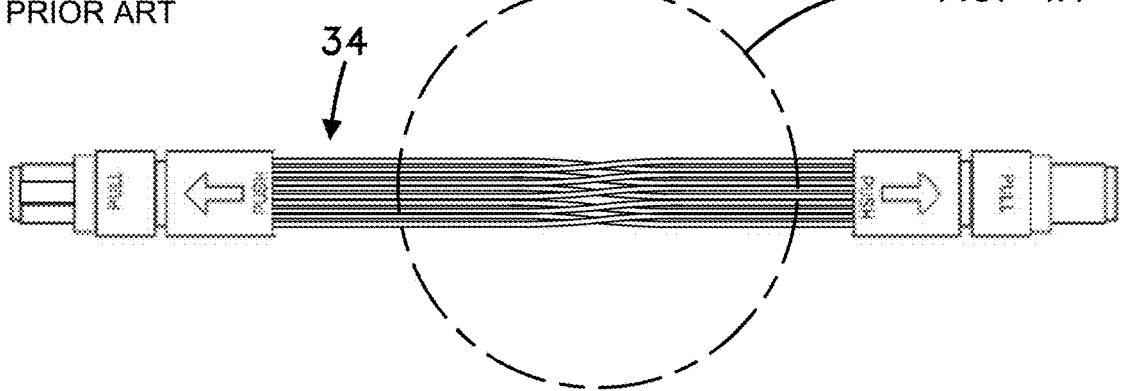
FIG. 4 depicts a prior art Type C patch cord assembly.
Figure 4A:
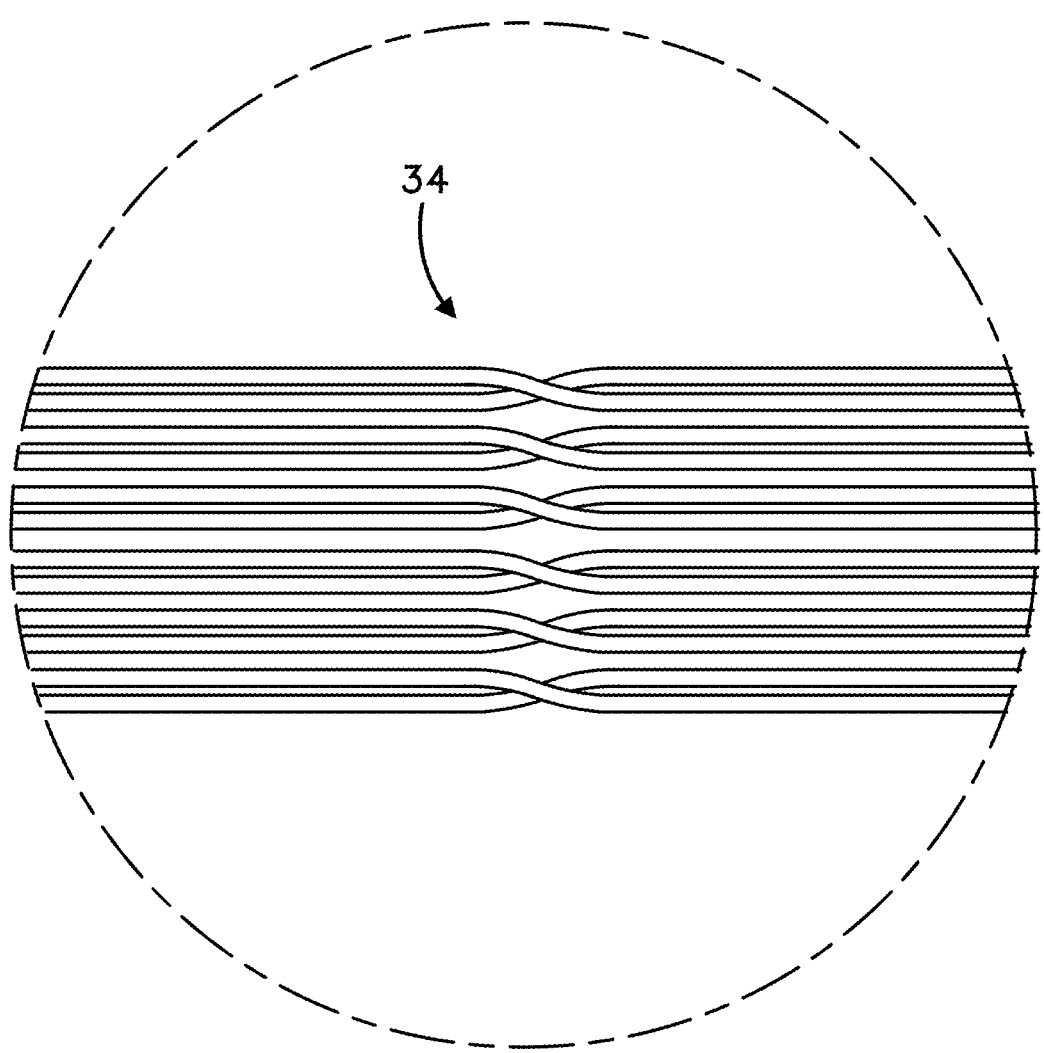
FIG. 4A is an enlarged view of a portion of FIG. 4 showing pair-wise fiber crossovers.
Figure 9:
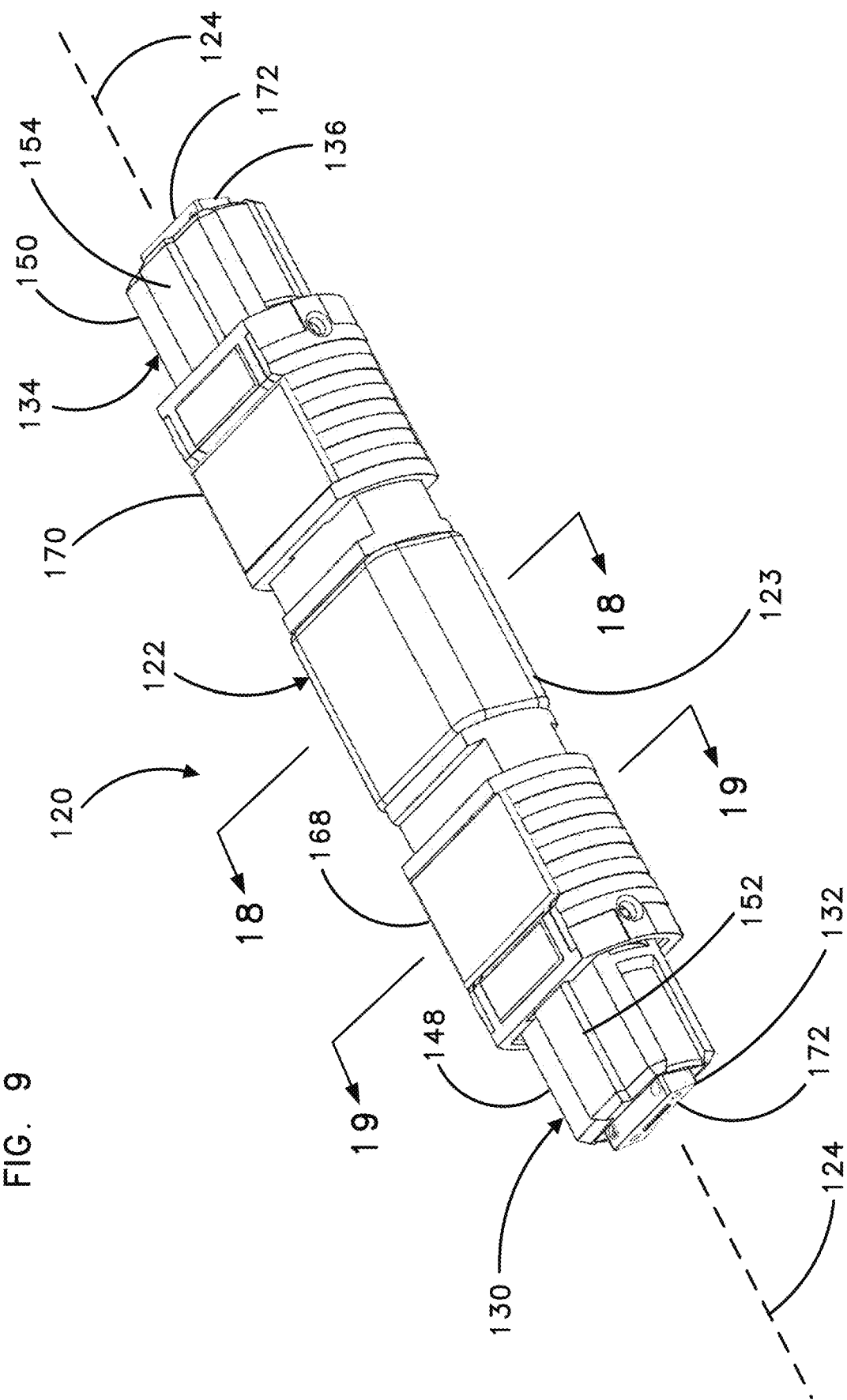
FIG. 9 is a perspective view depicting an example converter in accordance with the principles of the present disclosure.
Figure 10:
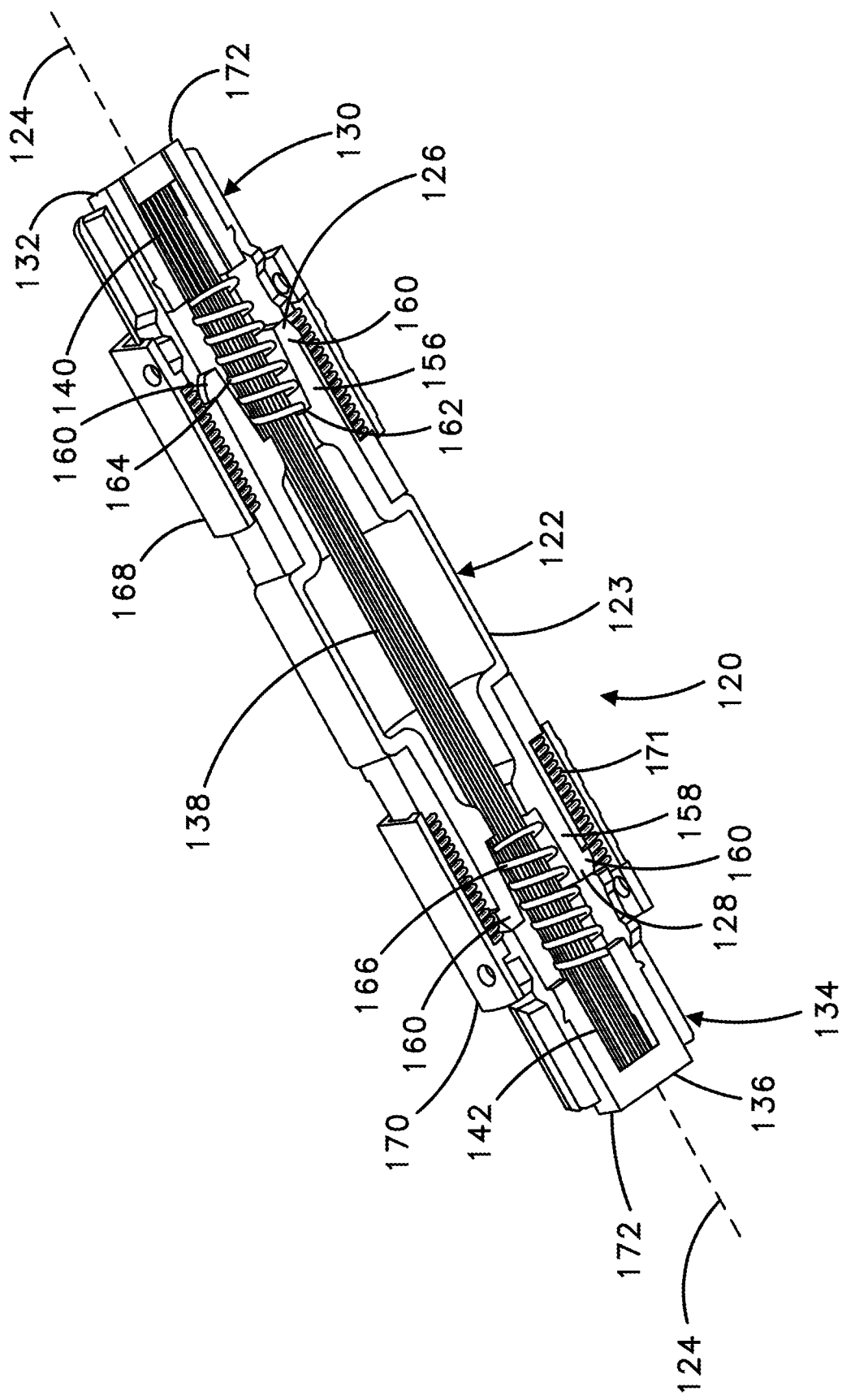
FIG. 10 is a cross-sectional view taken lengthwise through the converter of FIG. 9.

FIGS. 9 and 10 depict a converter 120 in accordance with the principles of the present disclosure. The converter 120 includes a housing 122 forming an elongate sleeve 123 having a length that extends along a central axis 124 between a first end 126 (see FIG. 10) and a second end 128 (see FIG. 10). The converter 120 also includes a first multi-fiber connector 130 integrated with the first end 126 of the sleeve. The first multi-fiber connector 130 includes a first multi-fiber ferrule 132. The converter 120 also includes a second multi-fiber connector 134 integrated with the second end 128 of the sleeve 123. The second multi-fiber connector 134 includes a second multi-fiber ferrule 136. The converter 120 further includes a plurality of optical fibers 138 routed through the housing 122. The optical fibers 138 have first end portions 140 at the first multi-fiber ferrule 132 and second end portions 142 at the second multi-fiber ferrule 136.

Figure 18:
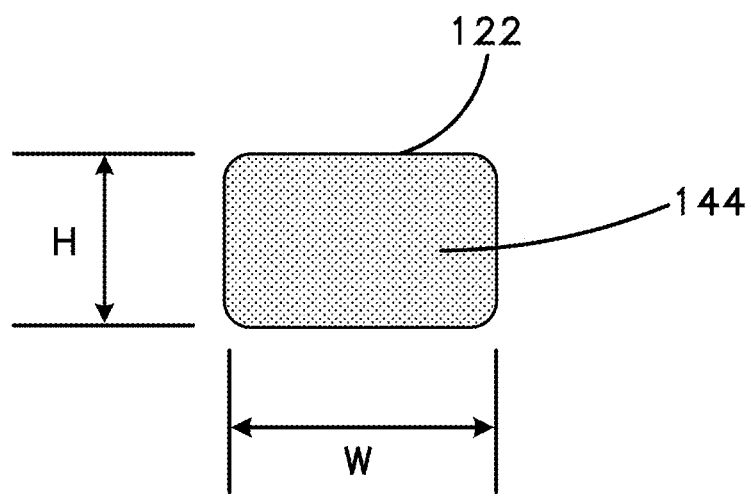
FIG. 18 is a cross-sectional view taken along section line 18-18 of FIG. 9.
Figure 19:
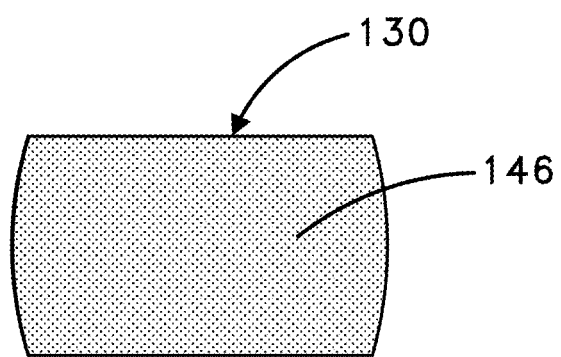
FIG. 19 is a cross-sectional view taken along section line 19-19 of FIG. 9.

In the depicted example, the converter 120 is sized to be a hand-held device and has a linear construction. In the depicted example, the housing 122 has a molded, plastic construction. Additionally, the housing 122 has a transverse cross-sectional profile which defines a first area 144 (see stippled area of FIG. 18) that in the depicted example is smaller than a second area 146 (see stippled area of FIG. 19) defined by a maximum transverse cross-sectional profile of each of the first and second multi-fiber connectors 130, 134. In the depicted example, the first area 144 is defined at a central location along the length of the sleeve 123, while the second areas 146 are defined adjacent the ends 126, 128 of the sleeve 123. In certain examples, the converter 120 is not a cable. In certain examples, the housing 122 has a molded plastic construction that is relatively rigid. In certain examples, the housing 122 has a construction having sufficient rigidity to prevent the internal optical fibers 138 from being flexed when the housing 122 is exposed to normally expected side loading or torque loading. In the example of FIGS. 9 and 10, the first and second multi-fiber connectors 130, 134 are co-axially aligned, and only one multi-fiber connector is provided at each end of the sleeve 123.

In other examples, the first area 144 may be larger than the second area 146. In certain examples, the first area 144 may be no more than 50 percent larger than the second area 146. It will be appreciated that the relative sizes of the housing 122 are dependent upon ease of assembly as well as performance based considerations. In this regard, movement of the ferrules of the connectors 130, 134 when connections are made can cause the optical fibers 138 to flex or buckle within the interior of the housing 122. Thus, it is preferred for the housing 122 to have an internal profile that is sufficiently large to accommodate such buckling. Hence, the desire to allow for fiber buckling is one consideration that may influence the shape and size of the housing 122.

In certain examples, the converter 120 has a length that is less than 4 inches, or 3 inches, or 2.5 inches long. Further, in certain examples, the sleeve 123 has a transverse cross-sectional profile at its central region with a width W less than 2 inches and a height H less than 1.5 inches (see FIG. 18). Enlarging the first area 144 relative to the second area 146 can be in either the width W direction, the height H direction, or both. Additionally or alternatively, enlarging the housing 112 may be in an axial direction and along the central axis 124.

Referring back to FIGS. 9 and 10, the first and second multi-fiber connectors 130, 134 respectively include first and second connector bodies 148, 150 that respectively include first and second keys 152, 154. In the example of FIGS. 9 and 10, the first and second keys 152, 154 are both shown on the same side (e.g., an upper side) of the converter 120.

Referring to FIG. 10, the first end 126 of the sleeve 123 includes a first unitary connector mount 156 and the second end 128 of the sleeve 123 includes a second unitary connector mount 158. The first and second connector mounts 156, 158 each include latches 160 and a spring stop 162. The first connector body 148 at least partially houses the first multi-fiber ferrule 132 and is secured on the first connector mount 156 by the latches 160 of the first connector mount 156 (e.g., by a snap-fit connection). The second connector body 150 at least partially houses the second multi-fiber ferrule 136 and is secured on the second connector mount 158 by the latches 160 of the second connector mount 158 (e.g., by a snap-fit connection). The converter 120 also includes first and second springs 164, 166 mounted between the spring stops 162 and the first and second multi-fiber ferrules 132, 136. The first spring 164 is configured for biasing the first multi-fiber ferrule 132 outwardly from the first end 126 of the sleeve 123 in an orientation along the central axis 124. Similarly, the second spring 166 is configured for biasing the second multi-fiber ferrule 136 outwardly from the second end 128 of the sleeve 123 in an orientation along the central axis 124.

The sleeve 123 can have a one-piece construction or can have a multi-piece construction. For example, the sleeve 123 can have multiple pieces that attach together. In one example, the pieces are coupled by a snap-fit connection. The pieces can include two half-pieces that connect together. In one example, the half-pieces can include top and bottom half pieces that each extend from the first end 126 to the second end 128. In another example, the half-pieces can each define one of the ends 126, 128 of the sleeve 123. Sleeves having more than 2 pieces can also be used. In some examples, multi-piece construction can make assembly of the converter 120 more efficient.

Referring again to FIGS. 9 and 10, the first and second multi-fiber connectors 130, 134 further respectively include first and second release sleeves 168, 170 respectively mounted over the first and second connector bodies 148, 150. Springs 171 bias the first and second release sleeves 168, 170 in outward directions from the first and second ends 126, 128 of the sleeve 123.

In the example of FIGS. 9 and 10, the first and second multi-fiber connectors 130, 134 are MPO fiber optic connectors. Thus, the first and second multi-fiber ferrules 132, 136 are MPO ferrules, the first and second connector bodies 148, 150 are MPO connector bodies and the first and second release sleeves 168, 170 are MPO release sleeves. In a preferred example, the optical fibers 138 include twelve optical fibers with the first and second end portions 140, 142 each aligned in a row at each of the first and second multi-fiber ferrules 132, 136. In other examples, the converter 120 may include at least two fibers, at least four fibers, at least eight fibers, at least twelve fibers, or at least 16 fibers. In another example, converter 120 may include multiple rows of optical fibers supported at each of the ferrules 132, 136.

It will be appreciated that the converter 120 can be used in combination with fiber optic adapters. For example, Type A or Type B MPO adapters 36 or 38 can be mounted at the first multi-fiber connector 130 and/or the second multi-fiber connector 134 to facilitate connecting the multi-fiber connectors 130, 134 with other multi-fiber fiber optic connectors.

In the example of FIGS. 9 and 10, the first and second multi-fiber ferrules 132, 136 have end faces 172 that are oriented perpendicular relative to the central axis 124 and to the axes of the optical fibers 138. Additionally, the first and second multi-fiber ferrules 132, 136 are both female MPO ferrules. Female MPO ferrules can also be referred to as non-pinned ferrules. Also, the optical fibers 138 are routed in a Type-B configuration between the first and second multi-fiber ferrules 132, 136. For example, the first and second keys 152, 154 are positioned at the same side of the converter 120 and the optical fibers 138 do not flip as the optical fibers routed through the housing 122. Thus, the optical fibers are laterally transposed between the first and second multi-fiber ferrules 132, 136 as would be expected in a Type-B routing configuration. In contrast, in a Type-A fiber routing configuration, the optical fibers would not be laterally transposed between the first and second multi-fiber ferrules 132, 136.

It will be appreciated that the optical fibers 138 of the converter 120 are preferably multi-mode optical fibers, but for certain applications single-mode optical fibers may also be used. It will also be appreciated that since the first and second multi-fiber ferrules 132, 136 are both female ferrules, the converter 120 can readily be used to convert a male MPO interface into a female MPO interface. The converter 120 can also be used for polarity conversion. In other examples, the converter 120 could have a Type-A fiber routing configuration. Additionally, in other examples, the first and second multi-fiber ferrules 132, 136 could both be male MPO ferrules so that the converter could be configured for converting a female MPO interface into a male MPO interface. Additionally, in still another example, one of the first and second multi-fiber ferrules 132, 136 could be a male MPO ferrule while the other of the first and second multi-fiber ferrules 132, 136 could be a female MPO ferrule. Male MPO ferrules can also be referred to as pinned ferrules.

Figure 11:
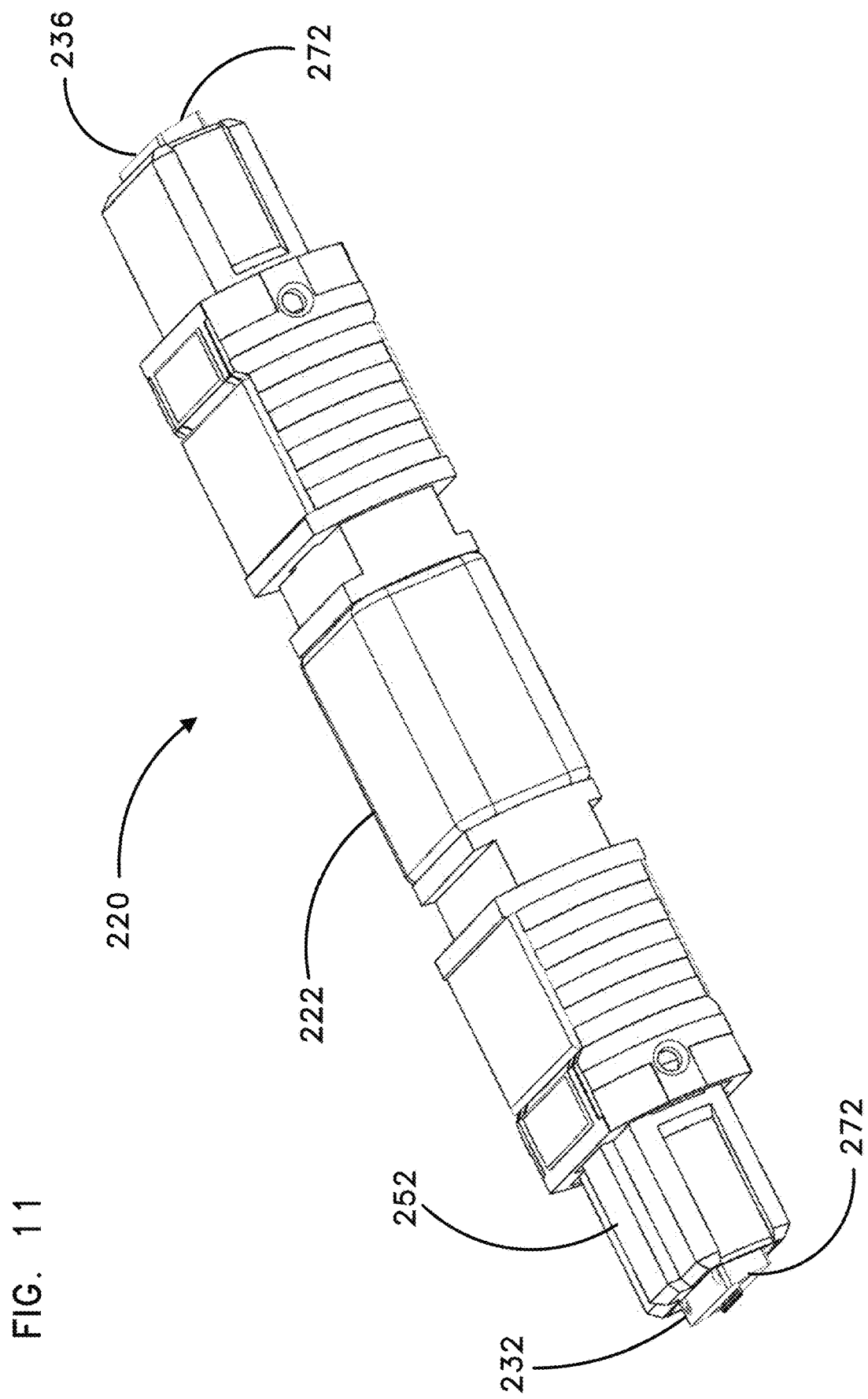
FIG. 11 is a perspective view depicting a second converter in accordance with the principles of the present disclosure.
Figure 12:
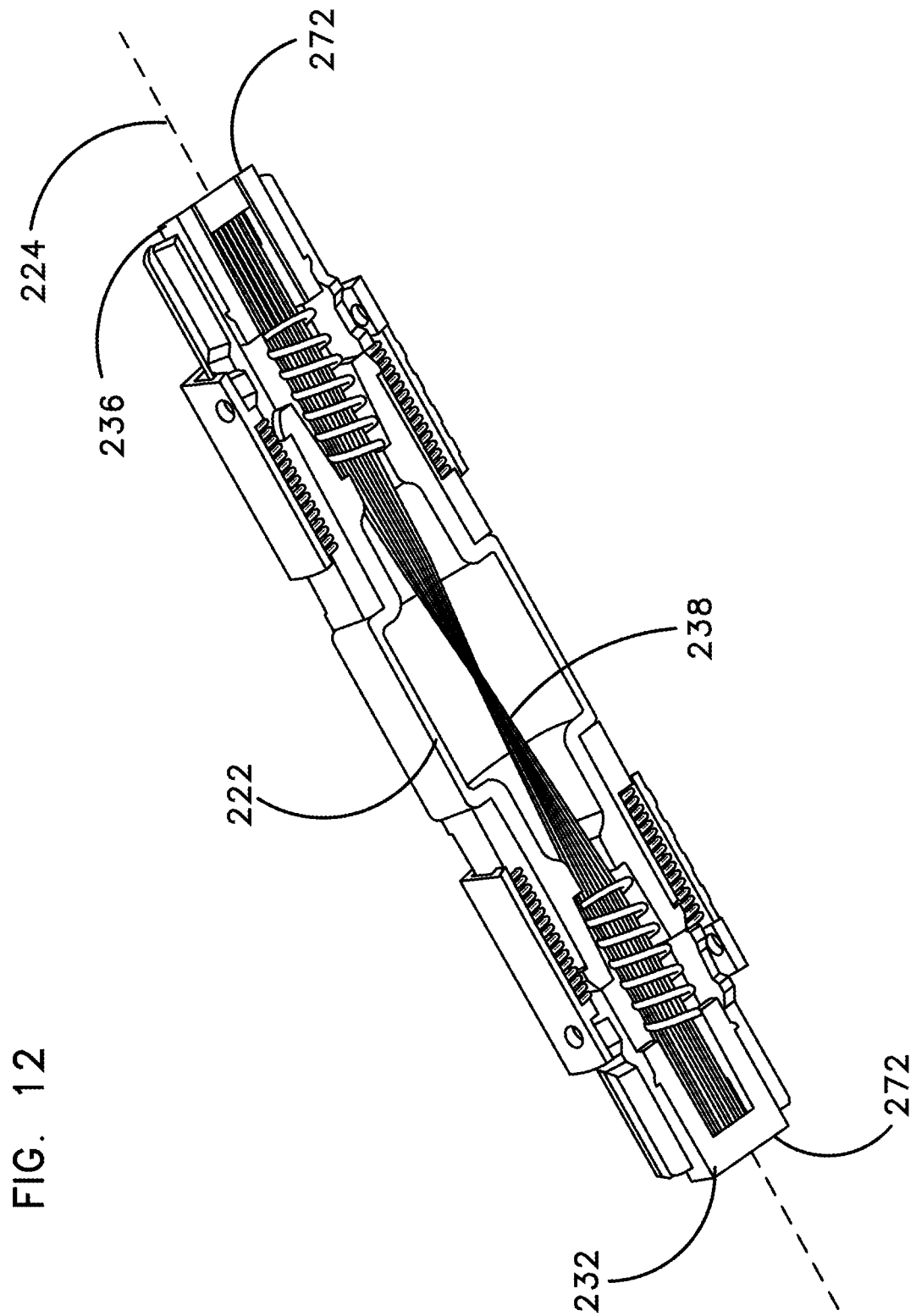
FIG. 12 is a cross-sectional view cut lengthwise through the converter of FIG. 11.

FIGS. 11 and 12 depict another converter 220 in accordance with the principles of the present disclosure. The converter 220 has the same basic parts as the converter 120, except for a number of modifications. For example, in the embodiment of FIGS. 11 and 12, first and second keys 252, 254 (254 not shown) are on opposite sides of converter 220, and optical fibers 238 are flipped within the housing 222. Because the optical fibers 238 are flipped within the housing 222, the optical fibers 238 have a Type-B routing configuration between the first and second multi-fiber ferrules 232, 236 even though the first and second keys 252, 254 are positioned on opposite sides of the converter 220. Additionally, end faces 272 are obliquely angled relative to a central axis 224 of the housing 222 and the axes of the optical fibers 238. The end faces 272 of first and second multi-fiber ferrules 232, 236 are both angled to face away from their respective first and second keys 252, 254. Thus, in the example of FIGS. 11 and 12, the first and second multi-fiber ferrules 232, 236 each have an angled-down configuration. Moreover, both of the multi-fiber ferrules 232, 236 of the converter 220 are female ferrules. Thus, converter 220 can be used to convert an angled-up MPO interface to an angled-down MPO interface, and can be used to convert a male MPO interface to a female MPO interface. In other examples, the converter 220 can have a Type-A fiber routing configuration. In still other examples, the first and second multi-fiber ferrules 232, 236 of the converter 220 can each have a male configuration. In still another example, one of the multi-fiber ferrules 232, 236 can have a male configuration while the other of the first and second multi-fiber ferrules 232, 236 can have a female configuration.

Figure 13:
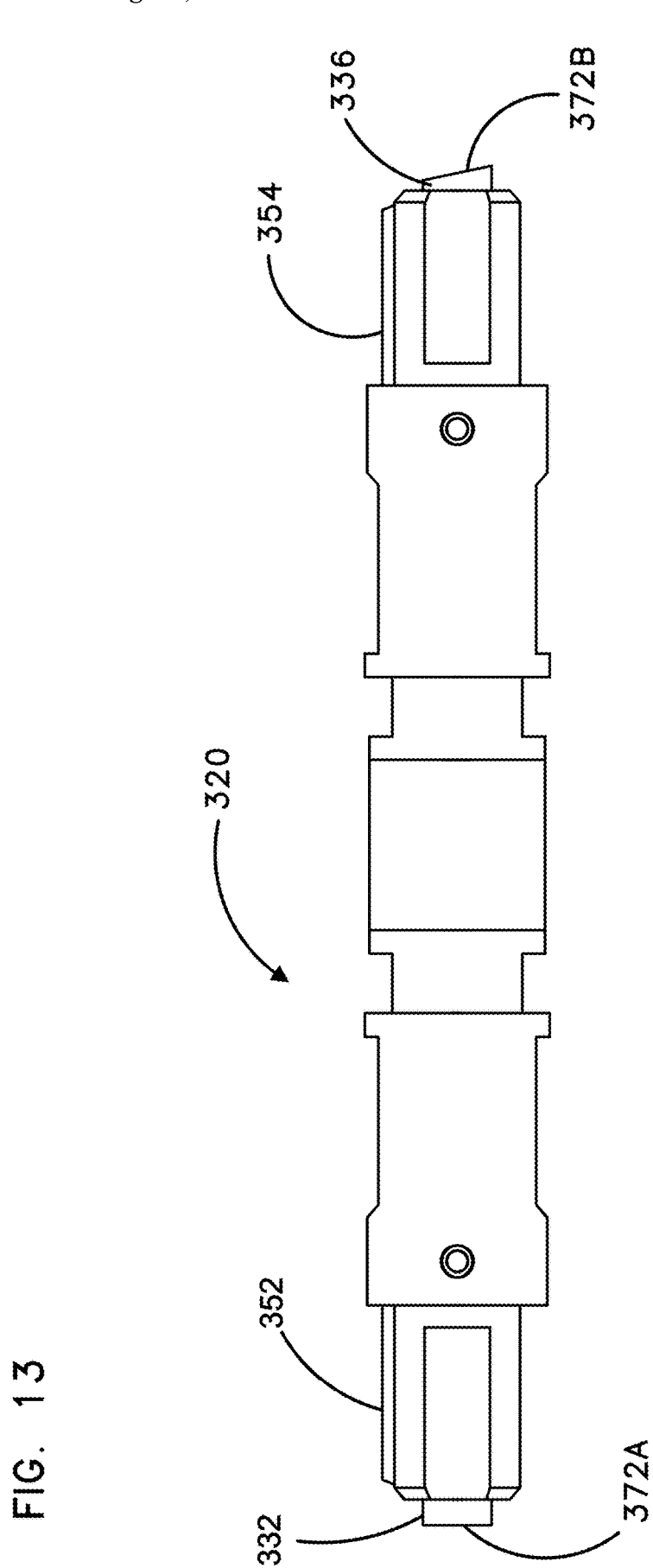
FIG. 13 is a side view of a third converter in accordance with the principles of the present disclosure.

FIG. 13 shows a third converter 320 in accordance with the principles of the present disclosure. Converter 320 has the same basic parts as the converter 120, but a number of features have been modified to provide different conversion functionality. For example, the converter 320 includes a first multi-fiber ferrule 332 having a perpendicular end face 372a and a second multi-fiber ferrule 336 having an obliquely angled end face 372b. First and second keys 352, 354 are provided at the same side of the converter 320. The obliquely angled end face 372b faces toward the key 354. It will be appreciated that the converter 320 can have either a Type A or Type B fiber routing configuration between the first and second multi-fiber ferrules 332, 336. In the depicted example, the first and second multi-fiber ferrules 332, 336 are both female. In other examples, first and second multi-fiber ferrules 332, 336 can be both male. Still in other examples, one of the first and second multi-fiber ferrules 332, 336 can be male while the other of the first and second multi-fiber ferrules 332, 336 can be female.

Figure 14:
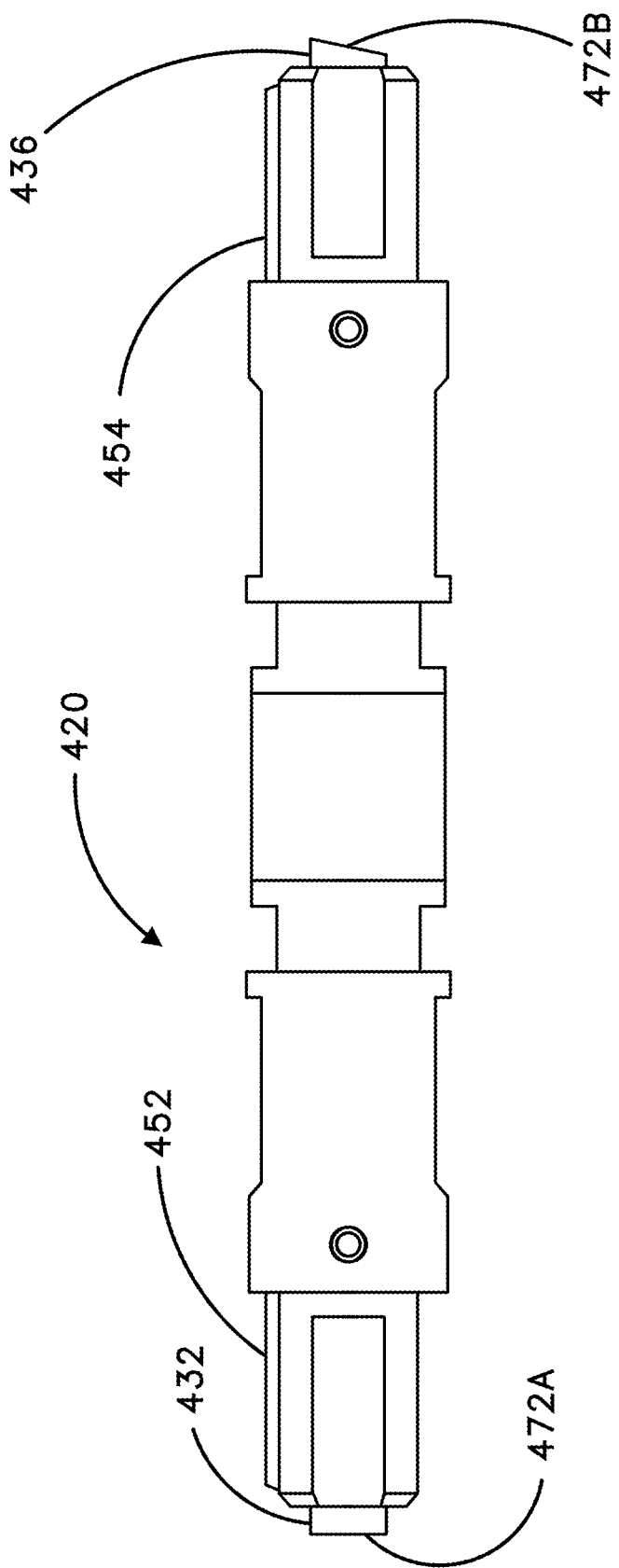
FIG. 14 is a side view of a fourth converter in accordance with the principles of the present disclosure.

FIG. 14 depicts a fourth converter 420 in accordance with the principles of the present disclosure. The converter 420 has the same components as the converter 120, except certain features have been modified to provide different converter functionality. The converter 420 includes first and second multi-fiber ferrules 432, 436 between which optical fibers are routed in the same way described with respect to the converter 120. The optical fibers can be routed in either a Type A or Type B routing configuration. The first multi-fiber ferrule 432 has a perpendicular end face 472a while the second multi-fiber ferrule 436 has an obliquely angled end face 472b. The converter 420 has first and second keys 452, 454 positioned at the same side of the converter 420. The end face 472b faces away from the key 454 and thus has an angled-down configuration. In the depicted example, the first and second multi-fiber ferrules 432, 436 are both female. In another example, the first and second multi-fiber ferrules 432, 436 can both be male. In still another example, one of the first and second multi-fiber ferrules 432, 436 can be male while the other of the first and second multi-fiber ferrules 432, 436 can be female.

Figure 15:
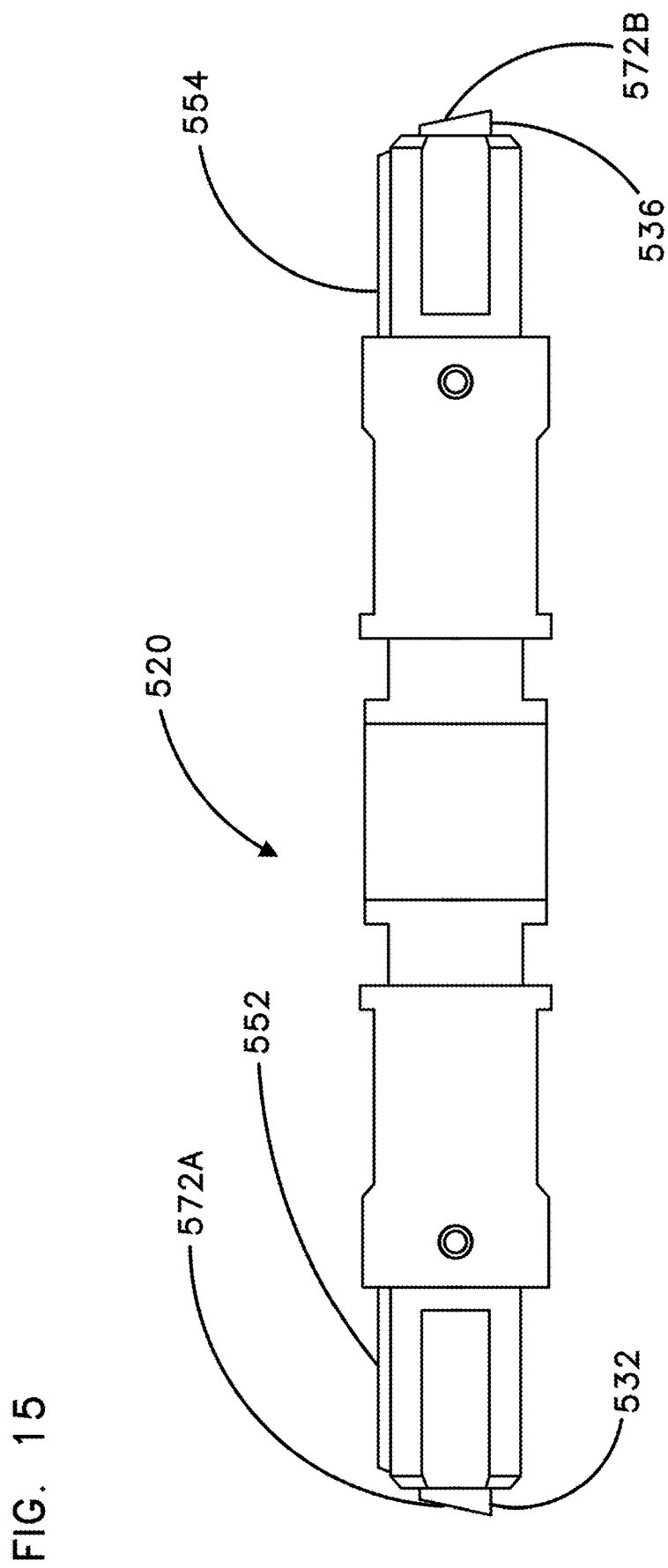
FIG. 15 is a side view of a fifth converter in accordance with the principles of the present disclosure.

FIG. 15 illustrates a fifth converter 520 in accordance with the principles of the present disclosure. The converter 520 has the same basic parts as the converter 120, with modifications to provide different converter functionality. For example, the converter 520 includes first and second multi-fiber ferrules 532, 536 having obliquely angled end faces. For example, the first multi-fiber ferrule 532 has an obliquely angled end face 572a that faces toward its respective key 552 and the second multi-fiber ferrule 536 has an obliquely angled end face 572b that faces toward its respective key 554. It will be appreciated that optical fibers can be routed between the first and second multi-fiber ferrules 532, 536 in the same way described with respect to the converter 120, and that the optical fibers can be routed in either a Type A or Type B routing configuration. In the depicted example, the first and second multi-fiber ferrules 532, 536 are depicted as being female ferrules. In other examples, the first and second multi-fiber ferrules 532, 536 can both be male ferrules. In still another example, one of the first and second multi-fiber ferrules 532, 536 can be male while the other of the first and second multi-fiber ferrules 532, 536 can be female. The converter 520 can be used to convert the gender of an MPO interface from male to female, and can be used to convert an angled-down MPO interface to angled-up MPO interface.

Figure 16:
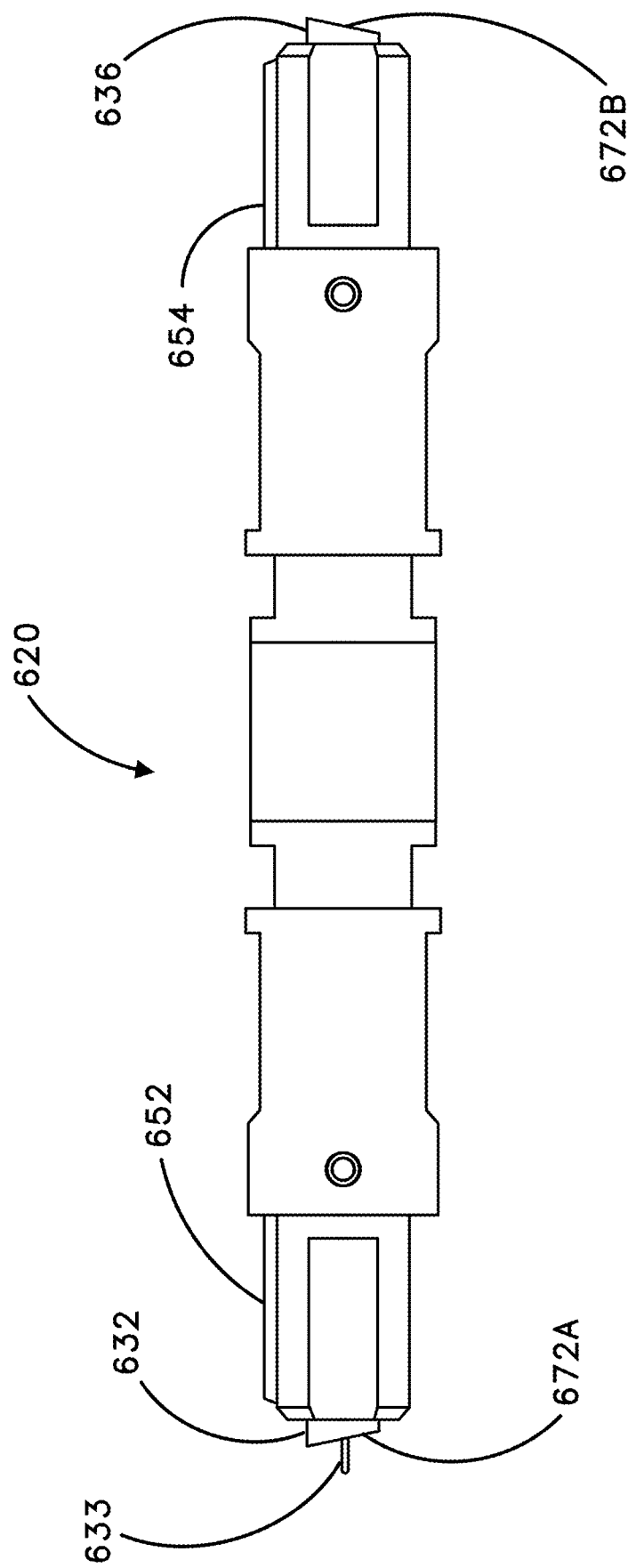
FIG. 16 is a side view of a sixth converter in accordance with the principles of the present disclosure.

FIG. 16 shows a sixth converter 620 in accordance with the principles of the present disclosure. The converter 620 has the same basic parts as converter 120, but some of the parts have been modified to provide different conversion functionality. The converter 620 includes first and second multi-fiber ferrules 632, 636 respectively having obliquely angled end faces 672a, 672b. The end face 672a of the first multi-fiber ferrule 632 is angled away from its respective key 652 and therefore has an angled-down configuration. The end face 672b faces towards its respective key 654 and therefore has an angled-up configuration. The first multi-fiber ferrule 632 has a male configuration and includes alignment pins 633, while the second multi-fiber ferrule 636 has a female configuration and includes unoccupied alignment pin openings. It will be appreciated that optical fibers can be routed between the ferrules 632, 636 in the same way described with respect to the converter 120. The optical fibers can be routed in either a Type A or Type B routing configuration. In other examples, the second multi-fiber ferrule 636 can be male and the first multi-fiber ferrule 632 can be female. In other examples, both of the multi-fiber ferrules 632, 636 can be male or both of the first and second multi-fiber ferrules 632, 636 can be male or both of the first and second multi-fiber ferrules 632, 636 can be female.

Figure 17:
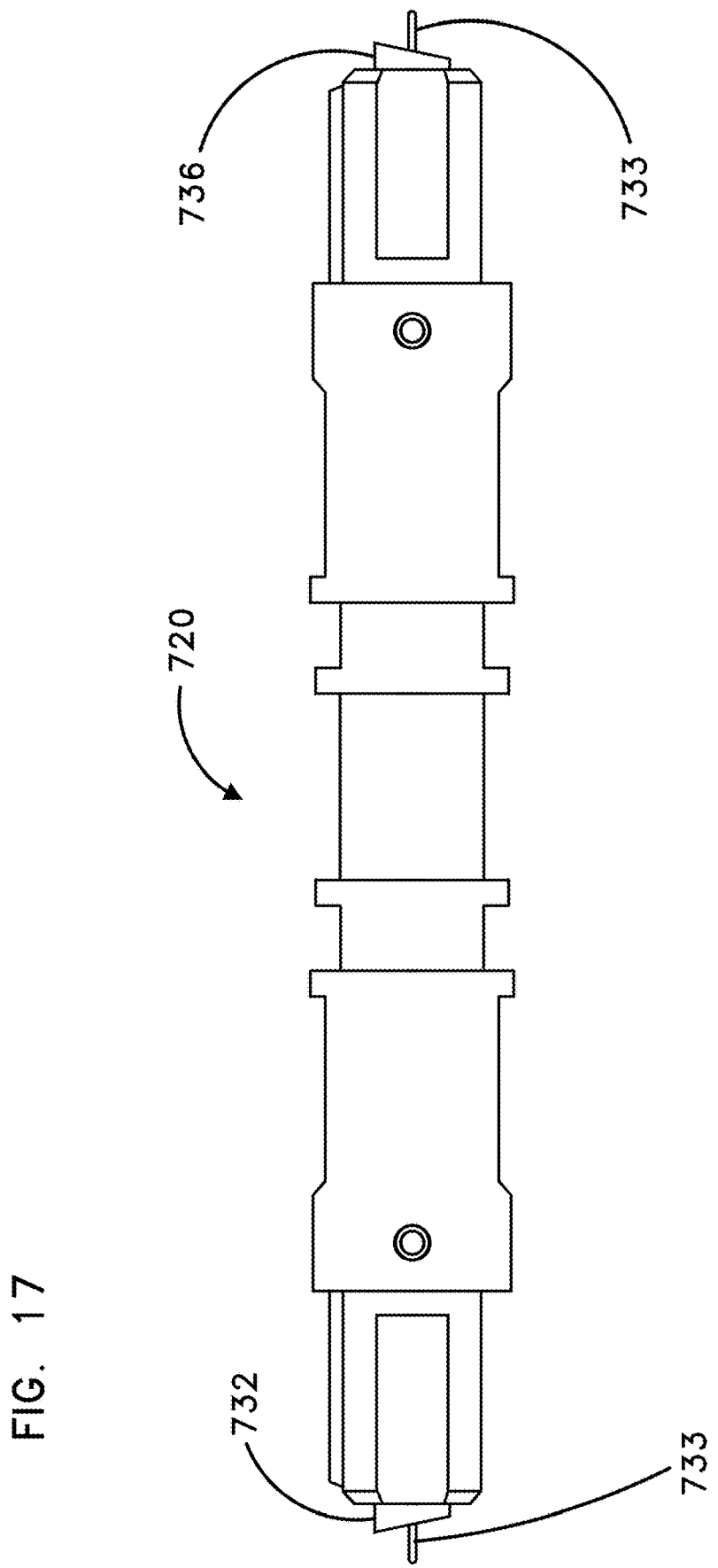
FIG. 17 is a side view of a seventh converter in accordance with the principles of the present disclosure.

FIG. 17 depicts a seventh converter 720 in accordance with the principles of the present disclosure. The converter 720 has the same configuration as the second converter 220 except the converter 720 has first and second multi-fiber ferrules 732, 736 that are both male as compared to female. The ferrules 732, 736 each include alignment pins 733.

The various examples described above are provided by way of illustration only and should not be construed to limit the scope of the present disclosure. Those skilled in the art will readily recognize various modifications and changes that may be made without departing from the true spirit and scope of the present disclosure.

What is claimed is:

1. A converter comprising:
   a housing forming an elongate sleeve having a length that extends along a central axis between a first end and a second end;
   a first multi-fiber connector integrated with the first end of the sleeve, the first multi-fiber connector including a first multi-fiber ferrule having a first end face;
   a second multi-fiber connector integrated with the second end of the sleeve, the second multi-fiber connector including a second multi-fiber ferrule having a second end face; and
   a plurality of optical fibers routed through the housing, the plurality of optical fibers having first end portions at the first end face of the first multi-fiber ferrule and second end portions at the second end face of the second multi-fiber ferrule, wherein the first end face faces a substantially opposite direction from the second end face relative to the central axis, and wherein the housing has a transverse cross-sectional profile at a central location which defines a first area and each of the first and second multi-fiber connectors have a maximum transverse cross-sectional profile adjacent the first and second ends of the sleeve which define a second area, the first area being no more than 50 percent larger than the second area.

2. The converter of claim 1, wherein each of the first and second multi-fiber connectors further include a release sleeve mounted over the respective connector, the maximum transverse cross-sectional profiles of each of the first and second multi-fiber connectors are defined by the release sleeves.

3. The converter of claim 1, wherein the first and second multi-fiber connectors are co-axially aligned.

4. The converter of claim 1, wherein the housing has a molded, plastic construction.

5. The converter of claim 1, wherein the first end of the sleeve includes a first unitary connector mount and the second end of the sleeve includes a second unitary connector mount, wherein the first and second connector mounts each include latches and a spring stop, wherein the converter includes a first connector body that at least partially houses the first multi-fiber ferrule and that is secured on the first connector mount by the latches of the first connector mount, wherein the converter includes a second connector body that at least partially houses the second multi-fiber ferrule and that is secured on the second connector mount by the latches of the second connector mount, and wherein the converter includes springs between the spring stops and the first and second multi-fiber ferrules for biasing the first multi-fiber ferrule outwardly from the first end of the sleeve and for biasing the second multi-fiber ferrule outwardly from the second end of the sleeve.

6. The converter of claim 5, further comprising first and second release sleeves respectively mounted over the first and second connector bodies.

7. The converter of claim 1, wherein the converter is less than 4 inches long.

8. The converter of claim 1, wherein the transverse cross-sectional profile is centered around the central axis, wherein the first and second multi-fiber connectors are co-axially aligned along the central axis, wherein the first multi-fiber connector is the only connector at the first end of the elongate sleeve, and wherein the second multi-fiber connector is the only connector at the second end of the elongate sleeve.

9. The converter of claim 1, wherein the converter is configured to be hand-held.

10. The converter of claim 1, wherein the sleeve has a transverse cross-sectional profile with a width less than 2 inches and a height less than 1.5 inches.

11. The converter of claim 1, wherein the sleeve has a molded plastic construction.

12. The converter of claim 1, wherein the first and second multi-fiber connectors respectively include first and second connector bodies that respectively include first and second keys.

13. The converter of claim 12, wherein the first and second multi-fiber connectors are MPO connectors.

14. The converter of claim 1, wherein the plurality of optical fibers have a Type-A routing configuration between the first and second multi-fiber ferrules.

15. The converter of claim 1, wherein the plurality of optical fibers have a Type-B routing configuration between the first and second multi-fiber ferrules.

16. The converter of claim 1, wherein the first and second multi-fiber ferrules have the same gender.

17. The converter of claim 1, wherein the first and second multi-fiber ferrules have opposite genders.

18. The converter of claim 1, wherein the first multi-fiber ferrule has a perpendicular end face and the second multi-fiber ferrule has an obliquely angled end face.

19. The converter of claim 1, wherein the first and second multi-fiber ferrules have obliquely angled end faces that face toward their respective first and second keys.

20. The converter of claim 1, wherein the first and second multi-fiber ferrules have obliquely angled end faces that face away from their respective first and second keys.

21. The converter of claim 1, wherein the first multi-fiber ferrule has an obliquely angled end face that faces toward a first key and the second multi-fiber ferrule has an obliquely angled end face that faces away from a second key.

22. A converter comprising:

a housing forming an elongate sleeve having a length that extends along a central axis between a first end and a second end;

a first multi-fiber connector integrated with the first end of the sleeve, the first multi-fiber connector including a first multi-fiber ferrule;

a second multi-fiber connector integrated with the second end of the sleeve, the second multi-fiber connector including a second multi-fiber ferrule; and a plurality of optical fibers routed through the housing, the plurality of optical fibers having first end portions at the first multi-fiber ferrule and second end portions at the second multi-fiber ferrule, wherein the first end of the sleeve includes a first unitary connector mount and the second end of the sleeve includes a second unitary connector mount, wherein the first and second connector mounts each include latches and a spring stop, wherein the converter includes a first connector body that at least partially houses the first multi-fiber ferrule and that is secured on the first connector mount by the latches of the first connector mount, wherein the converter includes a second connector body that at least partially houses the second multi-fiber ferrule and that is secured on the second connector mount by the latches of the second connector mount, and wherein the converter includes springs between the spring stops and the first and second multi-fiber ferrules for biasing the first multi-fiber ferrule outwardly from the first end of the sleeve and for biasing the second multi-fiber ferrule outwardly from the second end of the sleeve.

* * * * *